United States Patent
Oroskar et al.

(10) Patent No.: US 8,600,378 B1
(45) Date of Patent: Dec. 3, 2013

(54) ACCESS PROBE EVALUATION BASED ON AIR INTERFACE CONDITIONS

(75) Inventors: Siddharth Oroskar, Overland Park, KS (US); Sachin Vargantwar, Overland Park, KS (US); Deveshkumar Rai, Overland Park, KS (US); Bhagwan Khanka, Lenexa, KS (US); Anoop Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 812 days.

(21) Appl. No.: 12/504,871

(22) Filed: Jul. 17, 2009

(51) Int. Cl.
*H04W 24/02* (2009.01)

(52) U.S. Cl.
USPC ........ 455/434; 455/562.1; 455/466; 370/335; 370/352; 370/328; 375/316

(58) Field of Classification Search
USPC .......... 455/434, 562.1, 561, 456.5, 466, 137; 370/335, 352, 337, 328; 375/316
See application file for complete search history.

(56) References Cited

U.S. PATENT DOCUMENTS

| | | | |
|---|---|---|---|
| 5,734,646 A * | 3/1998 | I et al. | 370/335 |
| 6,252,867 B1 * | 6/2001 | Pfeil et al. | 370/335 |
| 6,646,604 B2 * | 11/2003 | Anderson | 342/465 |
| 7,801,030 B1 * | 9/2010 | Aggarwal et al. | 370/228 |
| 2004/0047324 A1 * | 3/2004 | Diener | 370/338 |
| 2005/0003865 A1 * | 1/2005 | Lastinger et al. | 455/562.1 |
| 2011/0012743 A1 * | 1/2011 | Van Gorp et al. | 340/686.6 |

* cited by examiner

*Primary Examiner* — Mahendra Patel

(57) ABSTRACT

Methods for evaluating an access probe transmitted by a wireless communication device (WCD) in a wireless communication system are disclosed. When an access probe is received by a radio access network (RAN), the RAN determines if the WCD that transmitted the access probe is physically located outside a predetermined distance from the RAN. If the WCD is located outside the predetermined distance from the RAN, the RAN evaluates whether a threshold air interface condition is met as part of a determination to accept the access probe and establish communication between the RAN and the WCD.

13 Claims, 4 Drawing Sheets

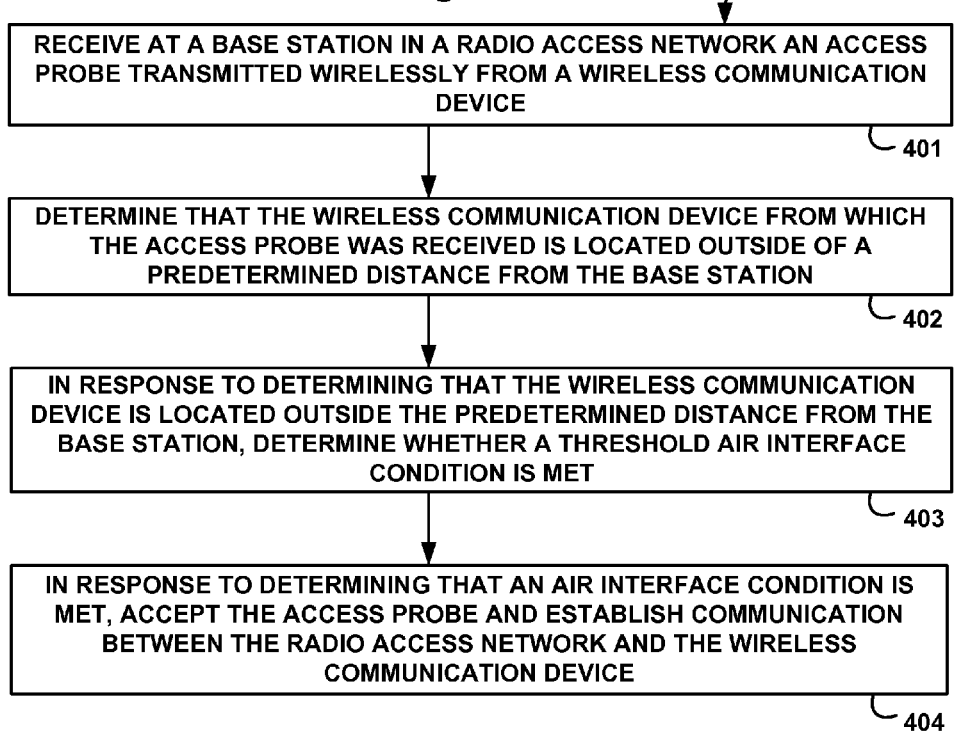

ACCESS PROBE EVALUATION BASED ON AIR INTERFACE CONDITIONS

BACKGROUND

As wireless communication systems and devices have grown in popularity and functionality, users of wireless communication devices (WCDs) have come to expect a high level of performance from radio access networks (RANs) within a wireless communication system. In addition to expecting a high level of performance from RANs, users have become increasingly reliant on the ability to use their WCDs in remote locations, such as rural roadways, parks, undeveloped tracts of land, and other areas geographically distant from transmitters within a wireless communication system.

Regardless of the growing expectations of users, the power required to transmit information to a WCD generally increases with the distance between a transmitter in the RAN and the WCD. To ensure sufficient coverage to users within a particular coverage area the RAN will typically deny an access probe sent from a WCD that is physically located outside of a predetermined radius from the transmitter. If the WCD is unable to connect with a RAN in one wireless communication system, the WCD may attempt to establish a connection with a roaming partner of the wireless communication system. However, when a user connects to a roaming partner, the user may be subjected to a limited ability to communicate with others and access data, charged additional fees, and exposed to other degradations in the overall user experience.

OVERVIEW

Methods for evaluating an access probe received by a RAN are presented herein. When a RAN receives an access probe transmitted wirelessly from a WCD, the RAN determines whether the WCD that sent the access probe is physically located outside of a cell radius from a receiver in the RAN. If the RAN determines that the WCD is located outside of the cell radius, the RAN does not automatically reject the access probe. In response to receiving the access probe, the RAN evaluates an air interface condition, such as the mobile transmit power associated with the access probe (i.e., the power of the signal transmitted by the WCD to send the access probe), or the receive-signal-quality at the WCD that transmitted the access probe, and determines if a threshold air interface condition is met. If the threshold air interface condition is met, the RAN accepts the access probe and establishes communication between the RAN and the WCD. If the air interface condition is not met, the RAN denies the access probe, and refuses to let the WCD engage in communication with the RAN.

Any method for determining the location of a WCD, or the distance between a WCD and the RAN may be used to determine whether the access probe received by the RAN was transmitted from a WCD outside of a predetermined distance from the RAN. One example way to determine whether the WCD is outside of a predetermined distance from a receiver in the RAN involves measuring a delay associated with the receipt of the access probe, such as the difference between the expected time of arrival of the access probe and the actual time of arrival of the access probe.

In some example methods, in order to facilitate the determination of whether the air interface condition is met, the WCD includes information about the mobile transmit power and the receive-signal-quality in the access probe sent to the RAN. When the access probe is received, the RAN reads the information in the access probe, and uses the information provided in the access probe to determine whether the air interface threshold condition is met.

These and other aspects and advantages will become apparent to those of ordinary skill in the art by reading the following detailed description, with reference where appropriate to the accompanying drawings. Further, it should be understood that the foregoing overview merely presents examples and is not intended to limit the scope of the invention as claimed.

BRIEF DESCRIPTION OF THE DRAWINGS

FIG. 4 is flow chart depicting a method in accordance with an example embodiment.

DESCRIPTION

Traditional RANs within a wireless communication system are designed to deny service to WCDs that are physically located outside of a predetermined distance from the RAN. The predetermined distance associated with a particular RAN can be based on any of a number of design aspects of a wireless communication system. In some situations, the predetermined distance from the RAN is based on the transmission power available to the RAN. Since the power required to successfully transmit signals from a transmitter within the RAN to a WCD generally increases with the distance between transmitter and the WCD, the predetermined distance is sometimes set to ensure that power required for the RAN to communicate with WCDs within a particular geographic area does not exceed the design limits of the transmitter or transmitters within the RAN. In other situations, the predetermined distance from the RAN is set to prevent an excessive overlap between adjacent coverage areas associated with RAN's within the wireless communication system.

However, if the RANs in a wireless communication system did not automatically deny service to distant WCDs, there would be many situations where a WCD and a RAN could effectively communicate with each other, despite the distance between the WCD and the RAN. In one example situation, the WCD may be only slightly beyond the predetermined distance from the RAN. In another example situation, the absence of interference from other signal sources may permit signals from the RAN to reach WCDs located beyond the predetermined distance from the RAN.

In situations where it is possible for a distant WCD and a RAN to engage in successful wireless communication, it may be advantageous from the user's perspective to allow the WCD and the RAN to communicate with each other. For example, in situations where the user and the WCD are located beyond the predetermined distance from the nearest RAN and no other wireless coverage is available, permitting the WCD and the RAN to communicate facilitates wireless communications that would be otherwise unavailable. In another example, permitting the WCD and the RAN to communicate allows the WCD to maintain communication within the user's preferred wireless communication system and alleviates the need for the WCD to seek out and connect to a different wireless communication system, such as a roaming partner.

I. Example Network Architectures

Figure 1:
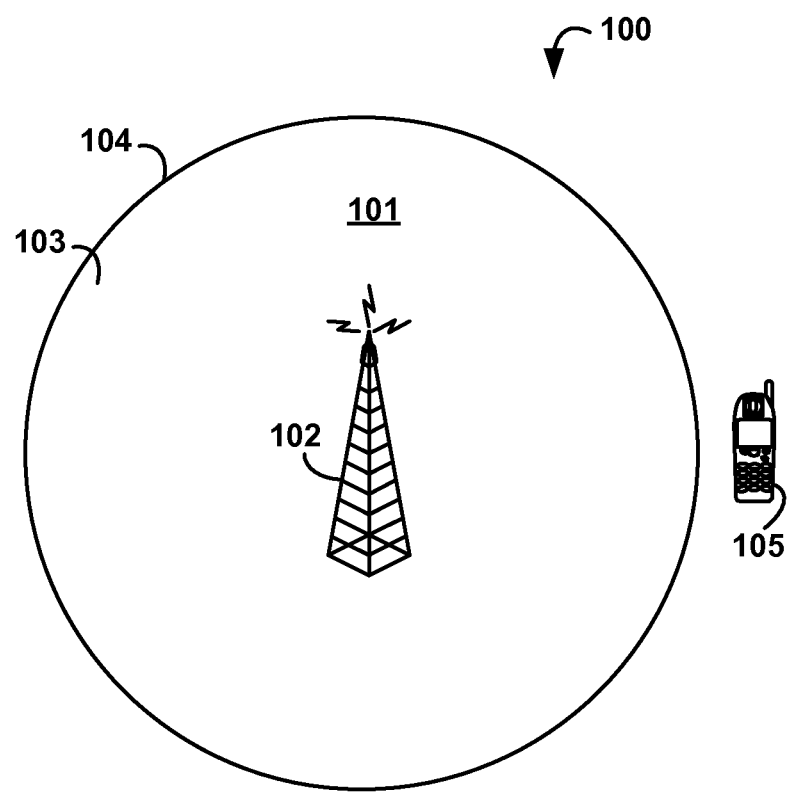
FIG. 1 is a block diagram of a portion of a wireless communication network in which example methods may be implemented.

FIG. 1 depicts a simplified block diagram of a portion of wireless communication system 100 in which example implementations of the claimed methods may be executed. As shown in FIG. 1, a RAN 101 includes a transceiver 102. For the purposes of simplicity, transceiver 102 is shown in FIG. 1 as a single structure that is capable of both sending and receiving wireless communication signals. However, it will be appreciated that RANs such as RAN 101 may be configured such that one or more structures are used to transmit signals from the RAN, while one or more different structures are used to receive wireless communication signals.

RAN 101 is designed to provide wireless communication coverage for a geographic area 103. The outer edge of the geographic area 103 is shown in FIG. 1 as a boundary 104. The size of the geographic area 103 and the location of boundary 104 are predetermined as part of the design of RAN 101. As shown in FIG. 1, WCD 105 is located outside of boundary 104, and is thus not within the geographic area 103 associated with the RAN 101. In traditional wireless communication systems, WCDs located beyond boundary 104, such as WCD 105, are considered to be too far away from the transceiver 102. In such traditional designs, attempts made by the WCD 105 to establish wireless communications with the RAN 101 are denied by the RAN 101 as long as the WCD 105 remains outside of the boundary 104.

In accordance with one aspect of the invention, when WCD 105 sends a request to access the RAN 101, the RAN 101 first determines whether WCD 105 is physically located beyond a predetermined distance from the transceiver 102. In FIG. 1, the predetermined distance is marked by boundary 104. Since WCD 105 is outside of boundary 104, WCD 105 is physically located beyond the predetermined distance from transceiver 102. Once the RAN 101 determines that the WCD 105 is physically located beyond the boundary 104, the RAN 101 determines whether a threshold condition is met. Any metric or parameter that provides an indication of whether the WCD 105 and the RAN 101 can engage in successful wireless communications can be used as a threshold condition. Air interface conditions are one type of conditions that indicate whether the WCD 105 and the RAN 101 may be able to engage in successful wireless communications. One example air interface condition that may be used as a threshold condition is the power necessary for the WCD 105 to send a signal to the RAN 101. Another example air interface condition that may be used as threshold condition is the quality of the signals received at the WCD 105 from the RAN 101.

If the RAN 101 determines that a threshold condition is met, it is likely that the WCD 105 and the RAN 101 can engage in successful wireless communications. In response to determining that the threshold condition is met, the RAN 101 allows the WCD 105 to access the RAN 101, and RAN 101 and WCD 105 attempt to engage in a wireless communication session. If the RAN 101 determines that the threshold condition is not met, it is unlikely that the RAN 101 and the WCD 105 could engage in successful wireless communications and the RAN 101 does not allow the WCD 105 to access the RAN 101.

Figure 2:
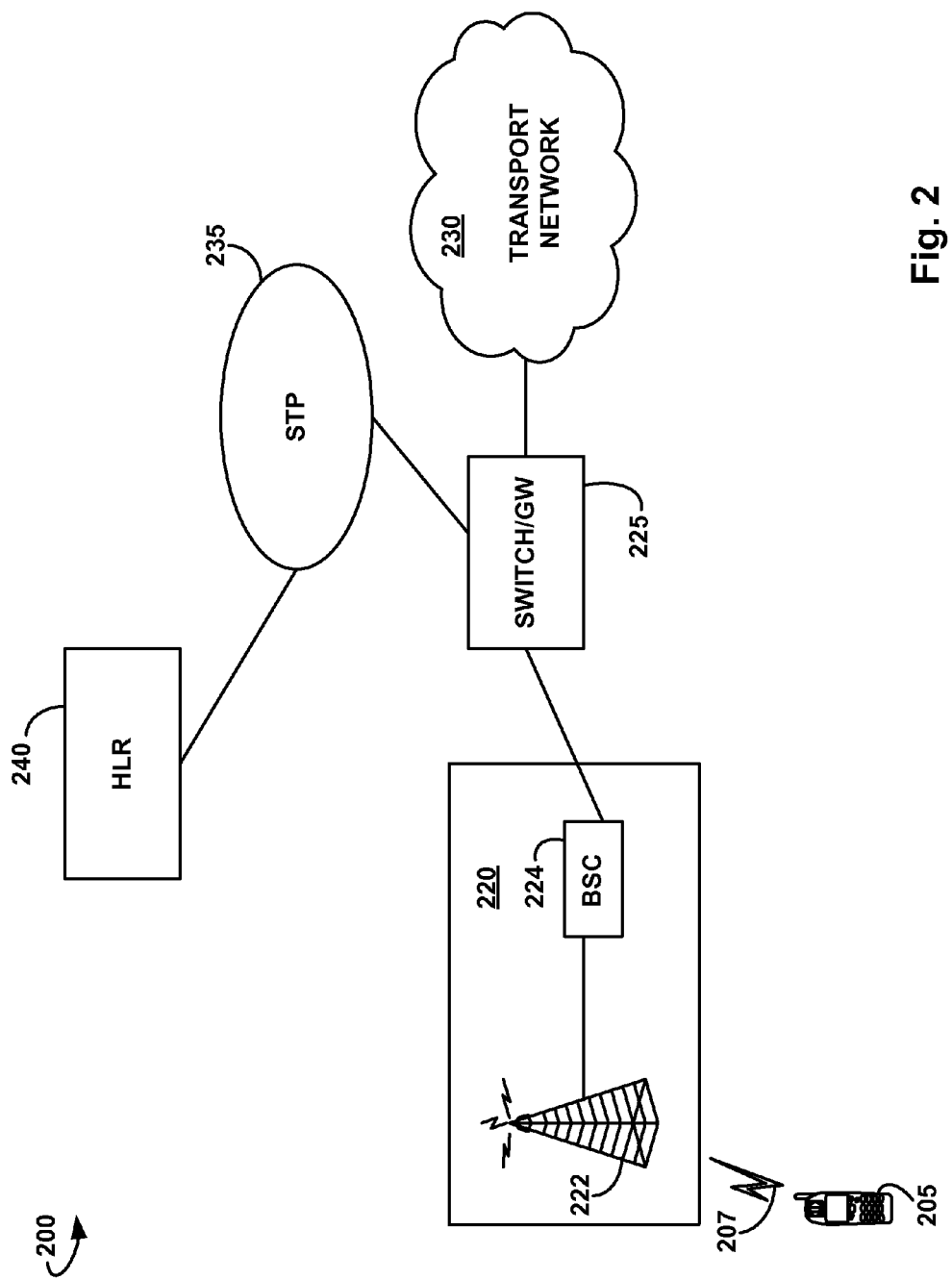
FIG. 2 is a block diagram of another communication network in which example methods may be implemented.

FIG. 2 depicts a simplified block diagram of a wireless communication system 200, in which example implementations of the claimed methods may be executed. System 200 includes a WCD 205, which may be a cellular phone, wireless personal digital assistant, a wireless enabled computer or any other device capable of wireless communication in system 200. While only one WCD 205 is depicted in FIG. 2, system 200 may include any number of WCDs.

The WCD 205 communicates via a radio air interface 207 with a base station 220. The base station 220 includes a base-station transceiver (BTS) 222 and a base-station controller (BSC) 224. The BTS 222 communicates with the WCD 205 using radio-frequency signals over the air interface 207. The BTS 222 also communicates with the BSC 224 to communicate voice and/or data information to and from the WCD 205.

The base station 220 is, in turn, coupled with a switch/gateway 225. The switch/gateway 225 may take the form of any number of devices. For example, for voice communication, the switch/gateway 225 may comprise a mobile switching center (MSC). Alternatively, for data communication, the switch/gateway 225 may comprise a packet data serving node (PDSN). MSCs and PDSNs are appreciated by those of ordinary skill in the art, and are thus not discussed in detail here for the purpose of brevity. Also, it will be appreciated that additional switch/gateway devices or systems may be coupled with the base station 220.

The switch/gateway device 225 is also coupled with a transport network 230. For voice communications, the transport network 230 may take the form of the public switched telephone network. Alternatively, for data communication, the transport network 230 may take the form of the public Internet or any suitable data network, such as a private packet data network.

The switch/gateway 225 is further coupled with a signal transfer point (STP) 235. The STP 235 provides for the transfer of signals between different entities in the system 200. For the particular example shown in FIG. 2, the STP 235 provides for transferring signals between the switch/gateway 225 and a home location register (HLR) 240. The HLR includes registration information for the WCD 205, and any other WCDs within a given portion of system 200. This registration information includes, for example, a unique mobile identification number for each of the WCDs. Additionally, the system 200 may include other entities that are coupled with the STP 235, such as additional switch/gateways devices, service nodes, or any number of other platforms or devices for providing communication services in system 200.

II. Measuring the Distance from a Wireless Communication Device to a RAN

In a wireless communication system such as system 100 depicted in FIG. 1, a WCD registers with the wireless communication system by sending an access probe to the RAN over an access channel on the reverse link of the air interface between the WCD and the RAN. The access probe carries an identifier of the WCD, along with additional information about the WCD.

In systems such as system 200 depicted in FIG. 2, the WCD sends the access probe in a "slotted aloha process." In the slotted aloha process, the WCD repeatedly sends the access probe at increasingly higher power levels until it receives an acknowledgement message from the base station, or until it otherwise exhausts the process, which can occur when the maximum transmission power of the WCD is reached and no acknowledgment has been received. Each access probe travels in a timeslot of an air interface access channel from the WCD to the base station, while each registration acknowledgement travels in a timeslot of an air interface paging channel from the base station to the WCD.

When the base station receives an access probe from a WCD, the base station first determines whether the WCD is within a predetermined distance from the base station. In an example implementation of the claimed methods, the RAN makes this determination by measuring the delay between the expected time of arrival of an access probe within a particular time slot and the actual time of arrival of the access probe. This delay in time can be measured in units of time called "chips", which, in an example wireless communication system, are approximately 0.8138 microseconds in duration and correspond to a distance of approximately 244 meters between the WCD and the base station.

In example methods that use chips to measure a delay, the base station measures the delay by counting the number of chips that pass between the expected arrival of the access probe and the actual arrival of the access probe from the WCD. Since each chip delay corresponds to a known distance from the base station to the WCD, the base station can determine whether the WCD is located beyond the predetermined distance from the base station. One example way to determine if the WCD is located beyond the predetermined distance from the base station comprises comparing the delay time, as measured in chip delays, to a predetermined number of chip delays that correspond to the time it takes transmissions from the base station to travel the predetermined distance associated with that base station. In other example implementations of the claimed methods, the base station may multiply the counted number of chip delays by a predetermined factor to convert the delay into another time measurement, such as seconds, or into a distance measurement. Such converted measurements can then be compared to known values that represent the predetermined distance from the base station. It will be appreciated by those skilled in the art that an example RAN may be designed such that an access window parameter and a cell radius are associated with the RAN. In implementations performed in such an example RAN, the access window parameter and the cell radius are considered to have different values, wherein the access window parameter has a greater window size than the cell radius.

Figure 3:
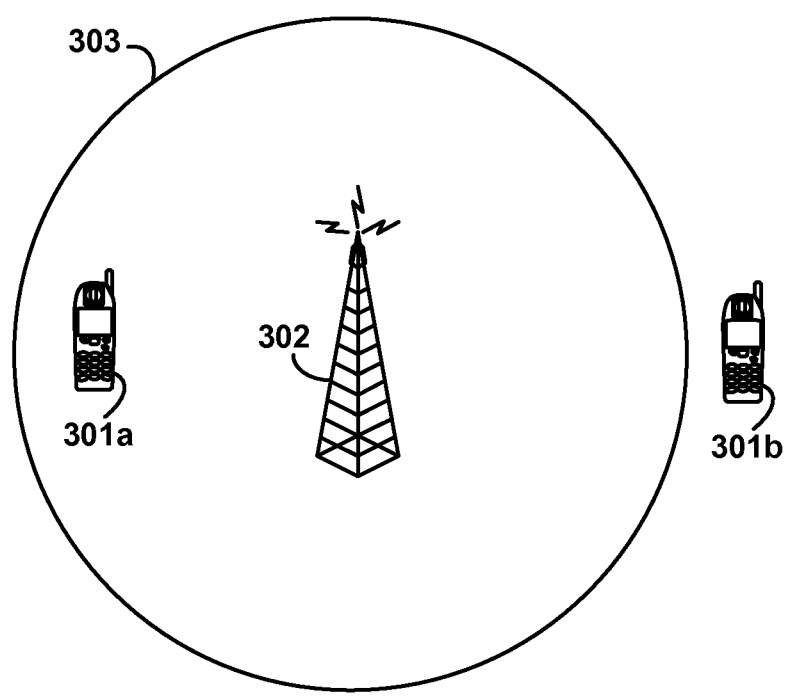
FIG. 3 is a diagram depicting a wireless communication in several positions near a transmitter within a wireless communication system.

FIG. 3 is a simplified map 300, depicting two example positions 301a and 301b of a WCD with respect to a base station 302. At position 301a, the WCD is within the predetermined distance 303 of the base station 302. In some example wireless communication systems, the predetermined distance 303 may be referred to as a cell radius. In some example situations, if the base station 302 is in a wireless communication system such as the system 200 depicted in FIG. 2 and receives an access probe from the WCD while the WCD is at position 301a, the base station 302 passes the access probe along to a switch (e.g., an MSC) or other entity (e.g., a PDSN), which then responsively sends a registration notification message to the WCD's home location register (HLR). The HLR may then update the WCD's profile to indicate where the WCD is operating (e.g., which switch is serving the WCD). The HLR can then send a registration response back to the WCD via the wireless communication system, including the air interface between the WCD and the base station. In other example situations, such as call origination, the WCD sends an access probe via the access channel.

In FIG. 3, position 301b is physically outside of the predetermined distance, or cell radius 303. In traditional wireless communication systems, if a WCD at position 301b sends an access probe to base station 302, the base station, or other network element responsible for evaluating access probes, will reject the access probe, regardless of the how close position 301b is to the edge of the predetermined distance 303, the system resources available to serve the WCD, or the ability of the WCD at position 301b to communicate with base station 302.

In accordance with example implementations of the claimed methods, rather than automatically rejecting an access probe from a WCD located outside of a cell radius or other predetermined distance from a RAN, the RAN determines whether a threshold air interface condition is met. Any of a number of parameters or metrics may be used as threshold air interface conditions, including the examples described below.

III. Example Threshold Air Interface Conditions

While RANs in traditional wireless communication systems reject access probes from WCDs that are located beyond a predetermined distance from the RAN, there are situations where the WCD and the RAN can engage in successful wireless communications despite the distance between the RAN and the WCD. It is possible to identify situations where successful communication between a distant WCD and a RAN can occur by evaluating conditions of the air interface between the WCD and the RAN. If one or more threshold air interface conditions are met, it is likely that the WCD and the RAN can successfully communicate with each other.

The RAN can evaluate any of a number of criteria to determine if a threshold air interface condition is met when an access probe is received from beyond a predetermined distance. For example, the RAN can examine the mobile transmit power associated with access probe sent by the WCD. As used herein, the term mobile transmit power refers to the power of the transmission of the access probe as sent from the WCD. In accordance with some communication protocols, a WCD that is attempting to access a RAN repeatedly sends access probes at increasingly higher power levels until the WCD receives an acknowledgement message from the RAN, or until the maximum transmission power for the WCD is reached and no acknowledgement of the access probe is received from the RAN. A relatively low mobile transmit power level indicates that the WCD is able to transmit a probe over the air interface at low power, which in turn indicates that the WCD may be able to engage in communication with the RAN without interfering with other WCDs in the RAN and without drawing excessive power from the transmitting WCD's battery.

Another parameter that the RAN is capable of evaluating to determine if a threshold air interface condition is met is the receive-signal-quality. As used herein, the term receive-signal-quality refers to any measurement of the quality of the signal a WCD receives from a RAN. One example metric of the receive-signal-quality is a signal-to-noise ratio of a forward link channel on the air interface, such as a pilot channel. The signal-to-noise ratio of a forward link pilot channel is calculated by taking the ratio of the pilot channel energy received at a WCD, denoted as Ec, to the total energy received at the WCD, denoted as Io. The result, referred to as Ec/Io, is typically expressed in decibels (dB) and usually falls within a range from 0.0 dB, which indicates excellent wireless coverage, to −16.0 dB, which is considered to indicate poor wireless coverage. However, if there is very weak wireless coverage for a WCD, the Ec/Io value may be even less than −16.0 dB.

A higher Ec/Io value indicates better wireless coverage of a WCD. Thus, if a WCD is located beyond a predetermined distance from a particular RAN, but maintains a relatively high Ec/Io value, it is likely that the WCD can successfully communicate with the RAN, despite the distance between the WCD and the RAN.

In example implementations of methods where data identifying the mobile transmit power, a measurement of receive-signal-quality, or any other air interface condition is available to the WCD, the WCD transmits the air interface condition information to the RAN as part of the data included in the access probe. In some of these example implementations, when the RAN receives the access probe, the RAN parses the access probe to identify the data describing an air interface condition, and compares the data to predetermined thresholds. If the air interface condition meets the threshold or thresholds used to determine whether the WCD and the RAN can effectively communicate with each other, the RAN can respond by allowing the WCD to engage in a wireless communication session with the RAN.

FIG. 4 is a flow chart depicting an implementation of an example method 400 in accordance with the invention. As shown in element 401 of FIG. 4, method 400 begins with receiving at a base station in a radio access network an access probe transmitted wirelessly from a WCD. In example implementations of the method 400, when a WCD attempts to register with a base station, the WCD sends an access probe in a timeslot on an access channel of the reverse link of the air interface between the base station and the WCD. In some example implementations of the method 400, the data in the access probe identifies the WCD, and also includes an estimation of the mobile-transmit-power and an indication of the receive-signal-quality of transmissions received by the WCD from the RAN.

As shown by element 402, after receiving the access probe from the WCD, the method 400 comprises determining that the WCD from which the access probe was received is located outside of a predetermined distance from the base station in the RAN. In some example implementations of the method 400, the predetermined distance is a cell radius associated with a base station in the RAN. In such example implementations, the cell radius of the base station defines a geographic area proximal to the base station and is used to generally distinguish WCDs that are close enough to the base station to ensure an acceptable level of wireless coverage from WCDs that may be too far away from the base station to effectively communicate with the base station.

One way of measuring the distance between a WCD and the base station in the RAN is to count the number of chip delays between the expected time of arrival of an access probe and the actual time of arrival of the access probe. In an example wireless communication system where a chip delay is defined as approximately 0.8138 microseconds, a signal transmitted from a WCD to a RAN can travel a distance of approximately 244 meters per chip delay. If an access probe is delayed by more than a threshold number of chip delays, the WCD is outside of the predetermined distance. In accordance with one aspect of the invention, if the WCD is outside the cell radius of the base station, the base station or another other element in the RAN determines whether an air interface threshold condition is met before determining whether to deny the WCD access to the RAN.

As shown by element 403 in FIG. 4, the method 400 comprises, in response to determining that the WCD is located outside the predetermined distance from the base station, determining whether a threshold air interface condition is met. If one or more threshold air interface conditions are met, it is likely that the WCD and the RAN can effectively communicate with each other, despite the increased distance between the air interface and the base station in the RAN.

One of the air interface threshold conditions that indicates the ability of a WCD to communicate with the RAN is the mobile transmit power associated with the access probe sent by the WCD. If the mobile transmit power is below a predetermined threshold, then it is likely that the WCD can effectively communicate with the RAN without requiring an excessive amount of power to transmit signals from the WCD, and without potentially interfering with other nearby WCDs.

In some example implementations of the method 400, in order to facilitate the determination of whether the mobile transmit power meets a predetermined threshold, the WCD includes an indication of the mobile transmit power in the access probe sent to the base station. Upon receiving the access probe, the base station or another element in the RAN parses the access probe, identifies the mobile transmit power, and compares the power associated with the access probe to the predetermined threshold.

Another air interface threshold condition that indicates the ability of a WCD to communicate with the RAN is the receive-signal-quality of transmissions received from the RAN by the WCD. Any of a number of metrics of receive-signal-quality can be used to determine whether a threshold air interface condition is met, including the parameter known as Ec/Io. As with the mobile transmit power, the WCD can facilitate the determination that a threshold air interface condition is met by including an indication of the receive-signal-quality as part of the data contained in the access probe transmitted from the WCD to the base station. Thus, when the access probe is received by the base station or other receiver in the RAN, the RAN can determine whether the quality of the signals received from the RAN at the WCD is sufficient to indicate that the RAN and the WCD can engage in successful wireless communication.

As shown in element 404, in response to determining that an air interface condition is met, the RAN accepts the access probe and establishes communication between the RAN and the WCD. Depending on the protocol used by the RAN, establishing communication between the WCD and the RAN may comprise registering the WCD, performing an authentication process, originating a communication session, or otherwise exchanging information between the WCD and the RAN.

If the RAN determines that an air interface condition is not met, then it is likely that the WCD is too far away from the RAN, or is otherwise incapable of engaging in effective communication with the RAN. As such, in response to determining that an air interface condition is not met, the RAN can reject the access probe and deny the WCD access to the wireless communication system.

Example embodiments of the present invention have been described above. However, those skilled in the art will understand that changes and modifications may be made to these embodiments without departing from the true scope and spirit of the invention, which is defined by the claims.

What is claimed is:

1. A method for evaluating an access probe transmitted by a wireless communication device in a wireless communication system comprising:

receiving at a radio access network an access probe transmitted wirelessly from a wireless communication device;

determining that the wireless communication device from which the access probe was received is located outside of a predetermined distance from the radio access network;

responsive to determining that the wireless communication device is located outside the predetermined distance from the radio access network, making a determination of whether a threshold air interface condition is met, wherein making the determination of whether the threshold air interface condition is met comprises determining whether a mobile transmit power level associated with the access probe is less than a predetermined level, wherein an indication of the mobile transmit power level is received by the radio access network in the access probe; and granting access in response to the access probe only if the determination is that the threshold air interface condition is met.

2. The method of claim 1 wherein determining whether an aspect of the access probe meets a predetermined threshold comprises determining that a receive-signal-quality at the wireless communication device exceeds a predetermined value.

3. The method of claim 2 wherein an indication of the receive-signal-quality at the wireless communication device is conveyed to the radio access network via the access probe.

4. The method of claim 1 wherein determining that the wireless communication device is located outside of the predetermined distance from the radio access network comprises measuring a delay associated with receiving the access probe.

5. The method of claim 1 further comprising:

in response to the determination being that the threshold air interface condition is met, accepting the access probe and originating a communication session between the wireless communication device and the radio access network.

6. The method of claim 1 further comprising:

in response to the determination being that the threshold air interface condition is not met, denying the access probe.

7. A method for determining whether to establish communication with a wireless communication device comprising:

receiving an access probe from a wireless communication device via an air interface in a wireless communication system;

calculating a distance between the wireless communication device that sent the access probe and a base station in a radio access network that received the access probe;

determining if the distance between the wireless communication device and the base station exceeds a predetermined limit;

in response to determining that the distance between the wireless communication device and the base station exceeds the predetermined limit, determining whether a threshold air interface condition is met, wherein determining whether the threshold air interface condition is met comprises determining whether a mobile transmit power level associated with the access probe is less than a predetermined level, wherein an indication of the mobile transmit power level is received by the radio access network in the access probe;

if the determination is that the threshold air interface condition is met, establishing wireless communication between the wireless communication device and the wireless communication system; and if the determination is that the threshold air interface condition is not met, denying the access probe.

8. The method of claim 7, wherein determining whether the threshold air interface condition is met comprises evaluating information contained in the access probe.

9. The method of claim 8 wherein evaluating information contained in the access probe comprises evaluating the indication of mobile transmit power.

10. The method of claim 8 wherein evaluating information contained in the access probe comprises evaluating a receive-signal-quality associated with the wireless communication device.

11. The method of claim 10 wherein determining whether the threshold air interface condition is met comprises determining whether the receive-signal-quality associated with the wireless communication device exceeds a predetermined value.

12. A method for evaluating an access probe transmitted by a wireless communication device in a wireless communication system comprising:

receiving at a base station in a radio access network an access probe transmitted wirelessly by a wireless communication device, wherein the access probe includes an indication of a transmission power associated with the access probe and an indication of a receive-signal-quality associated with the wireless communication device;

determining that a distance between the wireless communication device and the base station exceeds a predetermined limit, wherein the distance between the wireless communication device and the base station is calculated by measuring a transmission delay associated with the access probe; and in response to determining that the distance between the wireless communication device and the base station exceeds a predetermined limit, determining whether a threshold air interface condition is met, wherein determining whether a threshold air interface condition is met comprises determining that the transmit power associated with the access probe is below a predetermined power level and that the receive-signal-quality associated with the wireless communication device exceeds a predetermined quality level.

13. The method of claim 12, further comprising:

in response to determining that a threshold air interface condition is met, accepting the access probe and establishing wireless communication between the radio access network and the wireless communication device.

* * * * *